United States Patent
Kuo et al.

(10) Patent No.: US 12,094,125 B2
(45) Date of Patent: Sep. 17, 2024

(54) METHOD OF DISTINGUISHING OBJECTS IN IMAGES, COMPUTING DEVICE, AND STORAGE MEDIUM

(71) Applicant: HON HAI PRECISION INDUSTRY CO., LTD., New Taipei (TW)

(72) Inventors: Chin-Pin Kuo, New Taipei (TW); Guo-Chin Sun, New Taipei (TW); Yueh Chang, New Taipei (TW); Chung-Yu Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 395 days.

(21) Appl. No.: 17/557,262

(22) Filed: Dec. 21, 2021

(65) Prior Publication Data

US 2022/0198678 A1 Jun. 23, 2022

(30) Foreign Application Priority Data

Dec. 22, 2020 (CN) .......................... 202011531617.8

(51) Int. Cl.
  *G06V 20/58* (2022.01)
  *G06T 7/174* (2017.01)
  *G06V 10/20* (2022.01)

(52) U.S. Cl.
  CPC ............ *G06T 7/174* (2017.01); *G06V 10/255* (2022.01); *G06T 2207/10024* (2013.01); *G06T 2207/20081* (2013.01)

(58) Field of Classification Search
  None
  See application file for complete search history.

(56) References Cited

U.S. PATENT DOCUMENTS

| | | | |
|---|---|---|---|
| 2019/0147264 A1* | 5/2019 | Aoi .......................... | G06V 20/56 382/103 |
| 2020/0082219 A1* | 3/2020 | Li ........................... | G06V 20/56 |
| 2021/0248408 A1* | 8/2021 | Deng ........................ | G06T 7/13 |

FOREIGN PATENT DOCUMENTS

| | | |
|---|---|---|
| CN | 110490881 | 11/2019 |
| TW | 202008163 | 2/2020 |

OTHER PUBLICATIONS

John, Vijay, et al. "Free space, visible and missing lane marker estimation using the PsiNet and extra trees regression." 2018 24th International Conference on Pattern Recognition (ICPR). IEEE, 2018. (Year: 2018).*

* cited by examiner

*Primary Examiner* — Sean M Conner
(74) *Attorney, Agent, or Firm* — ScienBiziP, P.C.

(57) ABSTRACT

In a method of distinguishing objects in images, a first image segmentation model is applied to segment a first segmented image including a first object from a test image. A second image segmentation model is applied to segment a second segmented image including a second object from the test image. A third segmented image marking the first object and the second object is obtained according to first coordinates of the first object in the first segmented image and/or second coordinates of the second object in the second segmented image. The method can segment different objects from an image quickly and accurately.

18 Claims, 3 Drawing Sheets

METHOD OF DISTINGUISHING OBJECTS IN IMAGES, COMPUTING DEVICE, AND STORAGE MEDIUM

FIELD

The present disclosure relates to image processing, in particular to a method of distinguishing objects in images, a computing device, and a storage medium.

BACKGROUND

Detection of objects in the road is one of the most basic and important research in assisted driving. Improving a speed and accuracy of such detection is problematic.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
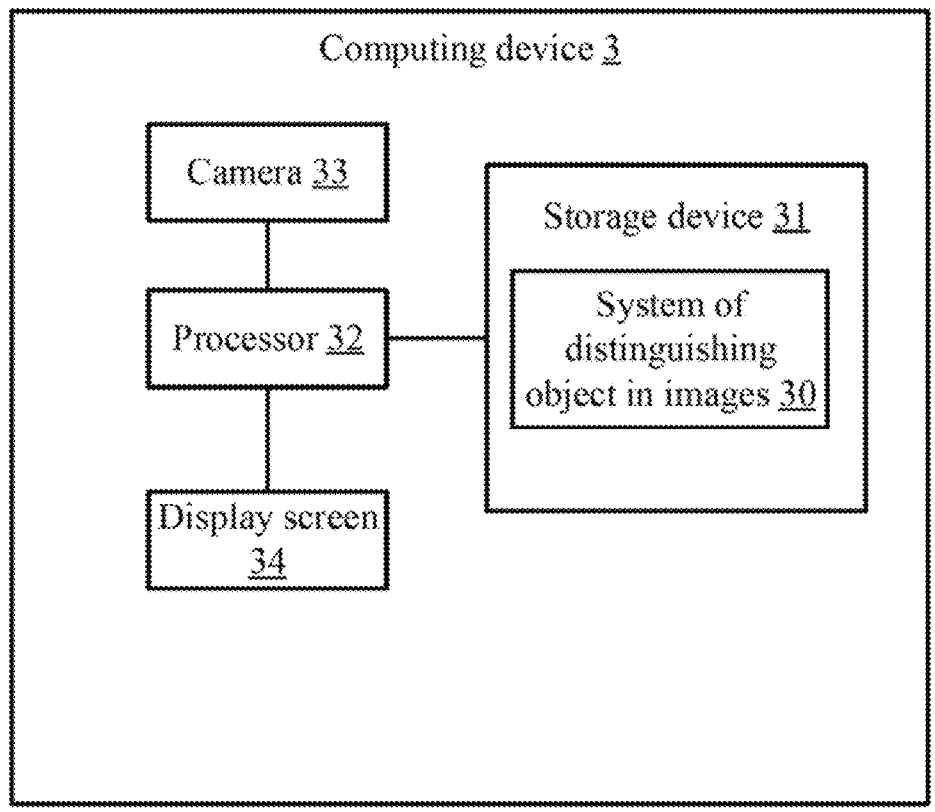
FIG. 1 illustrates a block diagram of a computing device in one embodiment of the present disclosure.

FIG. 1 illustrates a block diagram of a computing device in one embodiment of the present disclosure.

In the embodiment, the computing device 3 includes a storage device 31, at least one processor 32, a camera 33, and a display screen. The a storage device 31, the at least one processor 32, the camera 33, and the display screen are in electrical communication with each other.

Those skilled in the art should understand that the structure of the computing device 3 shown in FIG. 1 does not constitute a limitation of the embodiment of the present disclosure. The computing device 3 can further include more or less other hardware or software than that shown in FIG. 1, or the computing device 3 can have different component arrangements.

It should be noted that the computing device 3 is merely an example. If another kind of computing device can be adapted to the present disclosure, it should also be included in the protection scope of the present disclosure, and incorporated herein by reference.

In some embodiments, the storage device 31 may be used to store program codes and various data of computer programs. For example, the storage device 31 may be used to store a system of distinguishing objects in images 30 installed in the computing device 3 and implement completion of storing programs or data during an operation of the computing device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the computing device 3. The at least one processor 32 uses various interfaces and lines to connect various components of the computing device 3, and executes programs or modules or instructions stored in the storage device 31, and invokes data stored in the storage device 31 to perform various functions of the computing device 3 and to process data, for example, perform a function of distinguishing different objects in an image (such as a roadway, a sidewalk and a gap between the roadway and the sidewalk in a street view image). Details will be described with reference to FIG. 3.

In the embodiment, the system of distinguishing objects in images 30 can include one or more modules. The one or more modules are stored in the storage device 31 and are executed by at least one processor (e.g. processor 32 in the embodiment), such that a function of distinguishing different objects in an image (such as a roadway, a sidewalk and a gap between the roadway and the sidewalk in a street view image). Details will be described with reference to FIG. 3.

Figure 2:
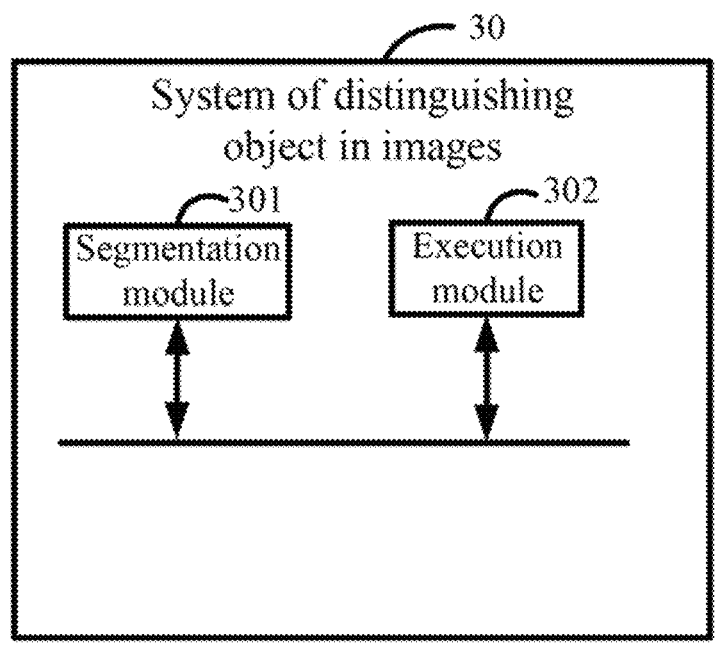
FIG. 2 shows modules of a system of distinguishing objects in images in one embodiment of the present disclosure.

In the embodiment, the system of distinguishing objects in images 30 can include a plurality of modules. Referring to FIG. 2, the plurality of modules includes an segmentation module 301, and an execution module 302. The module referred to in the present disclosure refers to a series of computer-readable instructions that can be executed by at least one processor (for example, the processor 32), and can complete functions, and can be stored in a storage device (for example, the storage device 31 of the computing device 3). Functions of each module will be described in detail with reference to FIG. 3.

Figure 3:
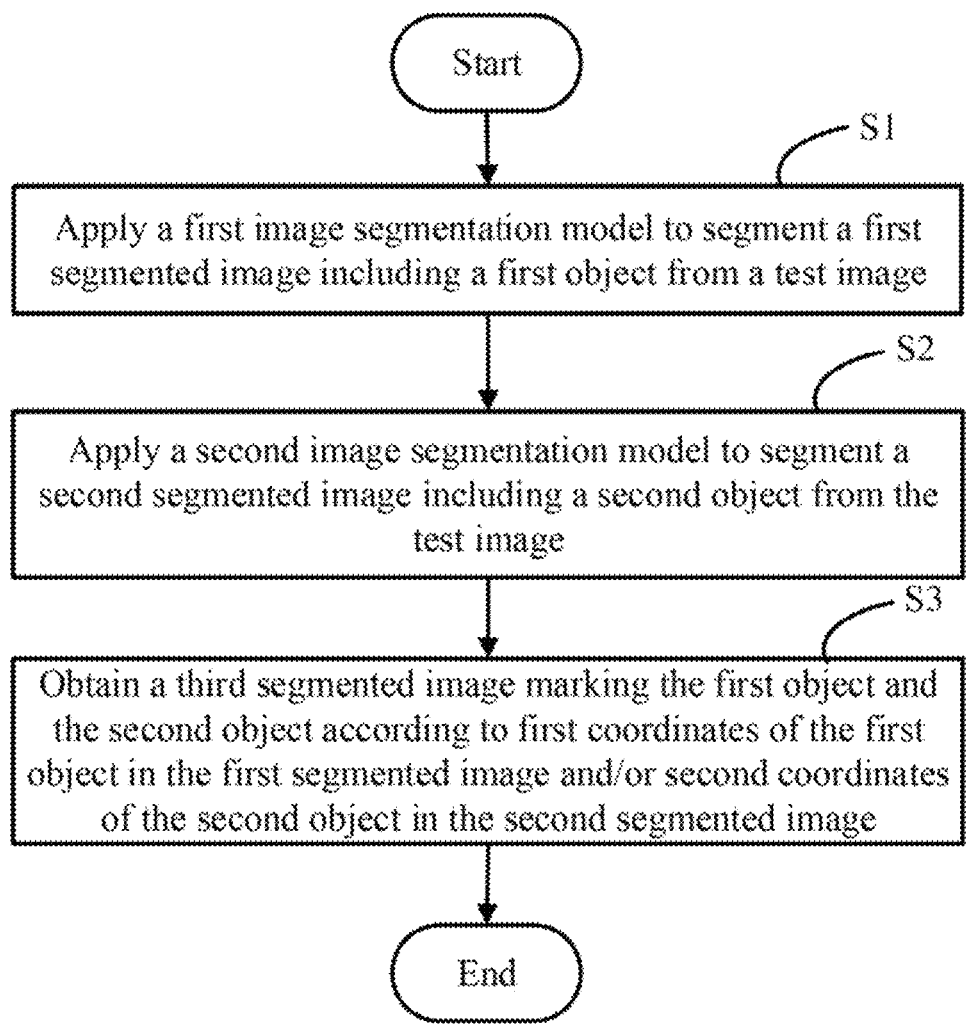
FIG. 3 shows a flow chart of a method of distinguishing objects in images in one embodiment of the present disclosure.

In the embodiment, an integrated unit implemented in a form of a software module can be stored in a non-transitory readable storage medium. The above modules include one or more computer-readable instructions. The computing device 3 or a processor implements the one or more computer-readable instructions, such that the method of distinguishing different objects in an image (such as a roadway, a sidewalk and a gap between the roadway and the sidewalk in a street view image) shown in FIG. 3 is achieved.

In a further embodiment, referring to FIG. 2, the at least one processor 32 can execute an operating system of the computing device 3, various types of applications (such as the system described above), program codes, and the like.

In a further embodiment, the storage device 31 stores program codes of a computer program, and the at least one processor 32 can invoke the program codes stored in the storage device 31 to achieve related functions. For example, each module of the system shown in FIG. 2 is program code stored in the storage device 31. Each module of the system shown in FIG. 2 is executed by the at least one processor 32, such that the functions of the modules are achieved, and the purpose of distinguishing different objects in an image (such as a roadway, a sidewalk and a gap between the roadway and the sidewalk in a street view image) is achieved. Details will be described below with reference to FIG. 3.

In one embodiment of the present disclosure, the storage device 31 stores one or more computer-readable instructions, and the one or more computer-readable instructions are executed by the at least one processor 32 to achieve the purpose of the disclosure. Specifically, the computer-readable instructions executed by the at least one processor 32 are described in detail in FIG. 3.

FIG. 3 is a flowchart of a method of distinguishing objects in images in one embodiment of the present disclosure.

In the embodiment, the method can be applied to the computing device 3 in FIG. 1. A function of distinguishing different objects in an image can be integrated in the computing device 3. A Software Development Kit (SDK) implementing the function of distinguishing different objects in an image can be run in the computing device 3.

Referring to FIG. 3, the method includes multiple blocks. According to different requirements, additional blocks can be added or fewer blocks can be utilized without departing from this disclosure.

At block S1, the segmentation module 301 applies a first image segmentation model to segment a first segmented image including a first object from a test image.

Segmenting a first segmented image including a first object from a test image refers to isolating a region including the first object from the test image. The first segmented image can be enlarged to a size as the test image. The first object can be marked in the first segmented image.

In the embodiment, the first object includes two sub-objects.

In one embodiment, the test image may be an image captured by the camera 33 of the computing device 3 in real time.

Figure 4A:
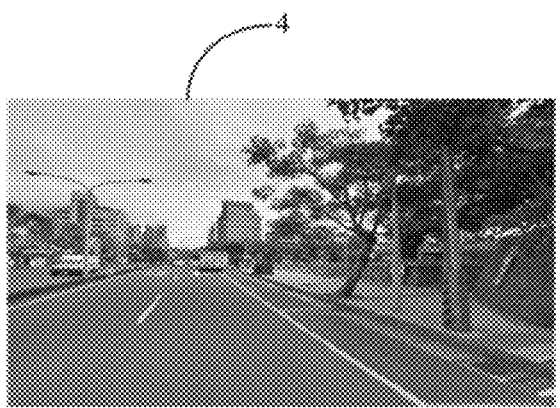
FIG. 4A illustrates a test image.

For example, the computing device 3 including the camera 33 may be an on-board computer installed on a car, the test image may be a street view image captured by the camera 33 when the car is driven. FIG. 4A illustrates a test image. The test image in FIG. 4A is a street view image.

In the example, the two sub-objects may be a roadway (or roadways) and a sidewalk (or sidewalks).

In the embodiment, the segmentation module 301 applies the first image segmentation model to segment the first segmented image including the two sub-objects from the test image.

Figure 4B:
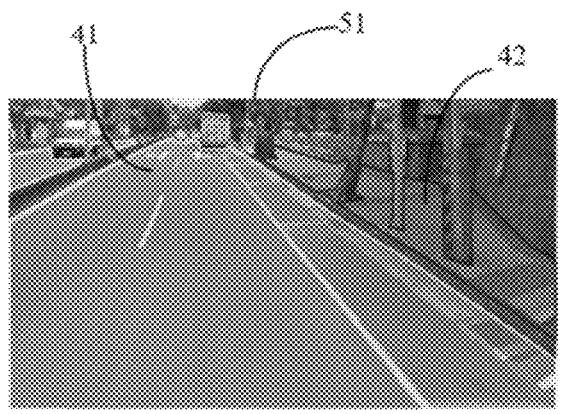
FIG. 4B illustrates segmenting a first segmented image including a roadway and a sidewalk from the test image.

FIG. 4B illustrates segmenting a first segmented image including a roadway and a sidewalk from the test image. In the example of FIG. 4B, the segmentation module 301 applies the first image segmentation model to segment a first segmentation image 51 including a roadway 41 and a sidewalk 42 from the test image 4.

In the embodiment, the first image segmentation model is an image semantic segmentation model.

At block S2, the segmentation module 301 applies a second image segmentation model to segment a second segmented image including a second object from the test image.

Segmenting a second segmented image including a second object from the test image refers to isolating a region including the second object from the test image. The second segmented image can be enlarged to a size as the test image. The second object can be marked in the second segmented image.

In the embodiment, the second object is different from the first object. The second object refers to an object located between the two sub-objects in the test image.

For example, the test image is a street view image, and the second object may be a gap between a roadway and a sidewalk.

Figure 4C:
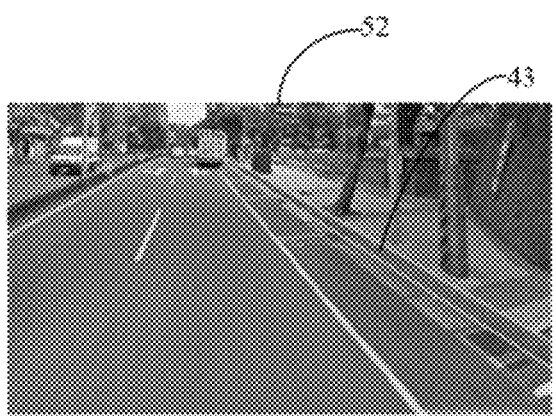
FIG. 4C illustrates segmenting a second segmented image including a gap between the roadway and the sidewalk from the test image.

FIG. 4C illustrates segmenting a second segmented image including a gap between the roadway and the sidewalk from the test image. In the example of FIG. 4C, the segmentation module 301 applies the second image segmentation model to segment a second segmented image 52 including a gap 43 between a roadway and a sidewalk from the test image.

The second image segmentation model may also be an image semantic segmentation model.

In the embodiment, the segmentation module 301 may use training samples to train a neural network to obtain the first image segmentation model and the second image segmentation model.

Specifically, the use of training samples to train a neural network to obtain the first image segmentation model and the second image segmentation model may include the process of (a1)-(a4), as follows. (a1) The segmentation module 301 collects multiple sample images, each of the sample images including the first object and the second object.

In the embodiment, the first object includes two sub-objects. The second object is different from the first object. The second object is an object located between the two sub-objects in the sample image.

For example, each sample image is a street view image. The first object in the sample image includes two sub-objects. The two sub-objects include a roadway and a sidewalk. The second object included in the sample image is a gap between the roadway and the sidewalk.

(a2) The segmentation module 301 marks the first object in each of the multiple sample images to obtain a first training sample set.

It should be noted that if the first object includes two sub-objects, the two sub-objects included in the sample image are marked differently.

(a3) The segmentation module 301 marks the second object in each of the multiple sample images to obtain a second training sample set.

(a4) The segmentation module 301 uses the first training sample set to train a neural network to obtain the first image segmentation model, and uses the second training sample set to train the neural network to obtain the second image segmentation model.

The neural network may be a convolutional neural network.

Using training samples to train a neural network to obtain an image segmentation model is an existing technology in the field, and will not be repeated here.

At block S3, the execution module 302 obtains a third segmented image marking the first object and the second object according to first coordinates of the first object in the first segmented image and/or second coordinates of the second object in the second segmented image.

In a first embodiment, obtaining a third segmented image marking the first object and the second object according to first coordinates of the first object in the first segmented image and/or second coordinates of the second object in the second segmented image includes the process of (b1)-(b2) as follows.

(b1) The execution module 302 obtains the second coordinates of the second object in the second segmented image.

The second coordinates of the second object in the second segmented image refer to coordinates of each pixel representing the second object in the second segmented image.

(b2) The execution module 302 marks the second object in the first segmented image according to the second coordinates to obtain the third segmented image.

Figure 4D:
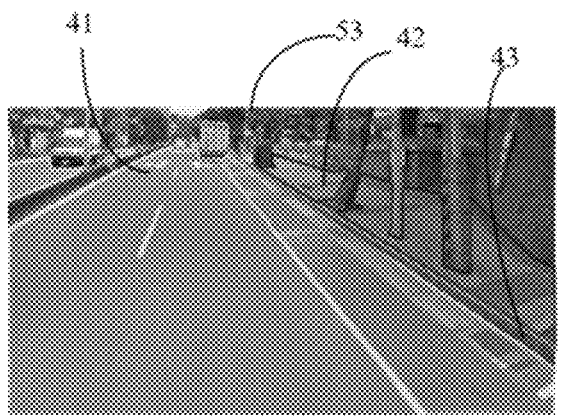
FIG. 4D illustrates obtaining a third segmented image marking the roadway, the sidewalk, and the gap between the roadway and the sidewalk.

FIG. 4D illustrates obtaining a third segmented image marking the roadway, the sidewalk, and the gap between the roadway and the sidewalk. Referring to FIGS. 4B, 4C, and 4D, the execution module 302 marks the gap 43 between the roadway 41 and the sidewalk 42 in the first segmented image 51 according to coordinates of the gap 43 in the second segmented image 52, to obtain a third segmented image 53.

In the embodiment, marking the second object in the first segmented image refers to filling the second object in the first segmented image with a preset color.

In a second embodiment, obtaining a third segmented image marking the first object and the second object according to first coordinates of the first object in the first segmented image and/or second coordinates of the second object in the second segmented image includes the process of (c1)-(c2) as follows.

(c1) The execution module 302 obtains the first coordinates of the first object in the first segmented image.

The first coordinates of the first object in the first segmented image refer to coordinates of each pixel representing the first object in the first segmented image.

(c2) The execution module 302 marks the first object in the second segmented image according to the first coordinates to obtain the third segmented image.

Marking the first object in the second segmented image refers to filling the first object in the second segmented image with a preset color. It should be noted that when the first object includes two sub-objects, different colors may be used to respectively fill the two sub-objects in the second segmented image.

In a third embodiment, obtaining a third segmented image marking the first object and the second object according to first coordinates of the first object in the first segmented image and/or second coordinates of the second object in the second segmented image includes the process of (d1)-(d4) as follows.

(d1) The execution module 302 creates a reference image.

In one embodiment, a size of the reference image is same as a size of the test image, and an RGB value of each pixel of the reference image is constant.

In the embodiment, the RGB value of each pixel of the reference image is (0, 0, 0).

(d2) The execution module 302 obtains the first coordinates of the first object in the first segmented image.

The first coordinates refer to coordinates of each pixel representing the first object in the first segmented image.

(d3) The execution module 302 obtains the second coordinates of the second object in the second segmented image.

The second coordinates refer to coordinates of each pixel representing the second object in the second segmented image.

(d4) The execution module 302 marks the first object in the reference image according to the first coordinates and marks the second object in the reference image according to the second coordinates to obtain the third segmented image.

In one embodiment, marking the first object in the reference image according to the first coordinates and marking the second object in the reference image according to the second coordinates includes: adjusting RGB values of pixels with the first coordinates in the reference image to a first preset value, and adjusting RGB values of pixels with the second coordinates in the reference image to a second preset value.

It should be noted that the first preset value is different from the second preset value. The first object and the second object can be isolated by setting the RGB values of the pixels corresponding to the first object and the RGB values of the pixels corresponding to the second object to different values in the reference image. For example, the first preset value may be (255, 255, 0). The second preset value may be (192, 192, 192).

In one embodiment, the execution module 302 displays the third segmented image on the display screen 34.

In one embodiment, the execution module 302 performs further control operations by reference to the third segmented image.

For example, the computing device 3 being an on-board computer on a car, and the second object being a gap between a roadway and a sidewalk, the execution module 302 can determine a distance between the car and the gap. When the distance is less than a preset value, the computing device 3 can warn a driver of the car to keep a safe distance between the car and the sidewalk. As such, the driver can take notice of the distance between the car and the sidewalk when driving the car, and a driving safety is improved.

For another example, in an unmanned car, when the distance is less than the preset value, the execution module 302 can adjust a direction or a speed of the car.

It should be noted that the execution module 302 may use a radar (not shown in the FIGs.) to detect the distance between the car and the gap, or use images captured by the camera 33 in calculating the distance between the car and the gap.

In addition, the above embodiments describe isolating in images the roadway, the sidewalk, and the gap between the roadway and the sidewalk. Those skilled in the art should understand that the present disclosure can isolate objects included in any image.

In the several embodiments provided in the preset disclosure, the disclosed computing device and method can be implemented in other ways. For example, the embodiments of the devices described above are merely illustrative. For example, divisions of the units are only by reference to logical function, and there can be other manners of division in actual implementation.

The modules described as separate components may or may not be physically separated, and the components displayed as modules may or may not be physical units, that is, they may be located in one place, or they may be distributed on multiple network units. Some or all of the modules can be selected according to actual needs to achieve the objectives of the solutions of the embodiments.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, not to indicate any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method of distinguishing objects in images applied to an on-board computer installed on a car, the method comprising:
    applying a first image segmentation model to segment a first segmented image comprising a first object from a test image, the test image being a street view image captured by a camera of the car when the car is driven;
    applying a second image segmentation model to segment a second segmented image comprising a second object from the test image;
    obtaining a third segmented image marking the first object and the second object according to first coordinates of the first object in the first segmented image and second coordinates of the second object in the second segmented image, the first object comprising a roadway and a sidewalk, the second object is a gap between the roadway and the sidewalk;
    determining a distance between the car and the gap; and
    adjusting a direction or a speed of the car in response that the distance is less than a preset value.

2. The method according to claim 1, further comprising:
    collecting multiple sample images, each of the sample images comprising the first object and the second object;
    marking the first object in each of the multiple sample images to obtain a first training sample set;
    marking the second object in each of the multiple sample images to obtain a second training sample set; and
    using the first training sample set to train a neural network to obtain the first image segmentation model, and using the second training sample set to train the neural network to obtain the second image segmentation model.

3. The method according to claim 1, obtaining a third segmented image marking the first object and the second object according to first coordinates of the first object in the first segmented image and second coordinates of the second object in the second segmented image comprising:
    obtaining the second coordinates of the second object in the second segmented image; and
    marking the second object in the first segmented image according to the second coordinates to obtain the third segmented image.

4. The method according to claim 1, obtaining a third segmented image marking the first object and the second object according to first coordinates of the first object in the first segmented image and second coordinates of the second object in the second segmented image comprising:
    obtaining the first coordinates of the first object in the first segmented image; and
    marking the first object in the second segmented image according to the first coordinates to obtain the third segmented image.

5. The method according to claim 1, obtaining a third segmented image marking the first object and the second object according to first coordinates of the first object in the first segmented image and second coordinates of the second object in the second segmented image comprising:
    creating a reference image;
    obtaining the first coordinates of the first object in the first segmented image;
    obtaining the second coordinates of the second object in the second segmented image; and
    marking the first object in the reference image according to the first coordinates and marking the second object in the reference image according to the second coordinates to obtain the third segmented image.

6. The method according to claim 5, a size of the reference image being same as a size of the test image, and a RGB value of each pixel of the reference image being same.

7. The method according to claim 6, marking the first object in the reference image according to the first coordinates and marking the second object in the reference image according to the second coordinates comprising:
    adjusting RGB values of pixels with the first coordinates in the reference image to a first preset value; and
    adjusting RGB values of pixels with the second coordinates in the reference image to a second preset value.

8. A computing device comprising:
    at least one processor; and
    a storage device storing computer-readable instructions, which when executed by the at least one processor, cause the at least one processor to:
    apply a first image segmentation model to segment a first segmented image comprising a first object from a test image, the test image being a street view image captured by a camera of a car when the car is driven;
    apply a second image segmentation model to segment a second segmented image comprising a second object from the test image;
    obtain a third segmented image marking the first object and the second object according to first coordinates of the first object in the first segmented image and second coordinates of the second object in the second segmented image, the first object comprising a roadway and a sidewalk, the second object is a gap between the roadway and the sidewalk;

determine a distance between the car and the gap; and adjust a direction or a speed of the car in response that the distance is less than a preset value.

9. The computing device according to claim 8, wherein the at least one processor is further caused to:

collect multiple sample images, each of the sample images comprising the first object and the second object;

mark the first object in each of the multiple sample images to obtain a first training sample set;

mark the second object in each of the multiple sample images to obtain a second training sample set; and use the first training sample set to train a neural network to obtain the first image segmentation model, and use the second training sample set to train the neural network to obtain the second image segmentation model.

10. The computing device according to claim 8, wherein the at least one processor is further caused to:

obtain the second coordinates of the second object in the second segmented image; and mark the second object in the first segmented image according to the second coordinates to obtain the third segmented image.

11. The computing device according to claim 8, wherein the at least one processor is further caused to:

obtain the first coordinates of the first object in the first segmented image; and mark the first object in the second segmented image according to the first coordinates to obtain the third segmented image.

12. The computing device according to claim 8, wherein the at least one processor is further caused to:

create a reference image;

obtain the first coordinates of the first object in the first segmented image;

obtain the second coordinates of the second object in the second segmented image; and mark the first object in the reference image according to the first coordinates and marking the second object in the reference image according to the second coordinates to obtain the third segmented image.

13. The computing device according to claim 12, a size of the reference image being same as a size of the test image, and a RGB value of each pixel of the reference image being same.

14. The computing device according to claim 13, wherein the at least one processor is further caused to:

adjust RGB values of pixels with the first coordinates in the reference image to a first preset value; and adjust RGB values of pixels with the second coordinates in the reference image to a second preset value.

15. A non-transitory storage medium having instructions stored thereon, when the instructions are executed by a processor of a computing device, the processor is configured to perform a method of distinguishing objects in images, the method comprising:

applying a first image segmentation model to segment a first segmented image comprising a first object from a test image, the test image being a street view image captured by a camera of a car when the car is driven;

applying a second image segmentation model to segment a second segmented image comprising a second object from the test image;

obtaining a third segmented image marking the first object and the second object according to first coordinates of the first object in the first segmented image and second coordinates of the second object in the second segmented image, the first object comprising a roadway and a sidewalk, the second object is a gap between the roadway and the sidewalk;

determining a distance between the car and the gap; and adjusting a direction or a speed of the car in response that the distance is less than a preset value.

16. The non-transitory storage medium according to claim 15, obtaining a third segmented image marking the first object and the second object according to first coordinates of the first object in the first segmented image and second coordinates of the second object in the second segmented image comprising:

obtaining the second coordinates of the second object in the second segmented image; and marking the second object in the first segmented image according to the second coordinates to obtain the third segmented image.

17. The non-transitory storage medium according to claim 15, obtaining a third segmented image marking the first object and the second object according to first coordinates of the first object in the first segmented image and second coordinates of the second object in the second segmented image comprising:

obtaining the first coordinates of the first object in the first segmented image; and marking the first object in the second segmented image according to the first coordinates to obtain the third segmented image.

18. The non-transitory storage medium according to claim 15, obtaining a third segmented image marking the first object and the second object according to first coordinates of the first object in the first segmented image and second coordinates of the second object in the second segmented image comprising:

creating a reference image;

obtaining the first coordinates of the first object in the first segmented image;

obtaining the second coordinates of the second object in the second segmented image; and marking the first object in the reference image according to the first coordinates and marking the second object in the reference image according to the second coordinates to obtain the third segmented image.

\* \* \* \* \*